US008038952B2

(12) United States Patent
Swanson

(10) Patent No.: US 8,038,952 B2
(45) Date of Patent: Oct. 18, 2011

(54) SURFACE TREATMENTS AND COATINGS FOR FLASH ATOMIZATION

(75) Inventor: Larry William Swanson, Laguna Hills, CA (US)

(73) Assignee: General Electric Company, Schenectady, NY (US)

( * ) Notice: Subject to any disclaimer, the term of this patent is extended or adjusted under 35 U.S.C. 154(b) by 452 days.

(21) Appl. No.: 12/200,026

(22) Filed: Aug. 28, 2008

(65) Prior Publication Data

US 2010/0055003 A1 Mar. 4, 2010

(51) Int. Cl.
*B01D 50/00* (2006.01)
*B01D 47/06* (2006.01)

(52) U.S. Cl. .................................. 422/168; 261/78.1

(58) Field of Classification Search .......... 422/129–168; 261/78.1

See application file for complete search history.

(56) References Cited

U.S. PATENT DOCUMENTS 3,384,154 A * 5/1968 Milton .......................... 165/133
3,728,859 A 4/1973 Seiler
3,764,069 A 10/1973 Rundstadler, Jr. et al.
4,040,479 A 8/1977 Campbell et al.
4,093,755 A * 6/1978 Dahl et al. .................... 427/451
4,160,526 A 7/1979 Flanagan
4,219,078 A 8/1980 Withers, Jr.
4,288,897 A 9/1981 Withers, Jr.
4,301,968 A * 11/1981 Berger et al. .............. 239/102.2
4,312,012 A 1/1982 Frieser et al.
4,337,896 A * 7/1982 Berger et al. .............. 239/102.2
4,663,243 A 5/1987 Czikk et al.
4,696,719 A 9/1987 Bischoff
4,724,591 A 2/1988 Zohler
4,753,849 A 6/1988 Zohler
4,801,394 A * 1/1989 Nakamura et al. .............. 252/75
4,846,267 A * 7/1989 Shattes et al. ................. 165/133
4,890,669 A * 1/1990 Zohler .......................... 165/133
4,963,289 A 10/1990 Ortiz et al.
5,173,274 A 12/1992 Owen
5,415,225 A 5/1995 Randlett et al.
5,814,392 A 9/1998 You et al.
5,884,611 A 3/1999 Tarr et al.
5,962,606 A 10/1999 Williams et al.
6,110,225 A 8/2000 Bunker et al.
6,263,661 B1 7/2001 Van der Burgt et al.

(Continued)

FOREIGN PATENT DOCUMENTS

EP 1878889 A1 1/2008

(Continued)

OTHER PUBLICATIONS

Rops et al., "Enhanced Heat Transfer for Pool Boiling at Micro Scale", Proceedings of the International Conference on Heat Transfer and Fluid Flow in Microscale (pp. 1-6). Brooklyn: ECI. (TUD), Sep. 2005.

(Continued)

*Primary Examiner* — Walter Griffin
*Assistant Examiner* — Huy-Tram Nguyen
(74) *Attorney, Agent, or Firm* — Cantor Colburn LLP

(57) ABSTRACT

A flash atomizer comprising a channel substrate configured to generate a vapor and form a two-phase flow of a fluid; and an enhanced surface disposed on the channel substrate and configured to change a temperature and a pressure required to form the vapor, wherein the enhanced surface texture comprises a plurality of active nucleation sites configured to promote heterogeneous bubble nucleation.

20 Claims, 2 Drawing Sheets

U.S. PATENT DOCUMENTS

| | | | |
|---|---|---|---|
| 6,405,523 | B1 * | 6/2002 | Foust et al. ..................... 60/776 |
| 6,453,659 | B1 * | 9/2002 | Van Liere et al. ............ 60/39.53 |
| 6,722,588 | B1 | 4/2004 | Elkas |
| 6,793,149 | B2 | 9/2004 | Schramm et al. |
| 7,300,227 | B2 * | 11/2007 | Li et al. ...................... 405/128.1 |
| 7,467,749 | B2 * | 12/2008 | Tarabulski et al. ................ 239/5 |
| 2003/0072213 | A1 | 4/2003 | Cocoli |
| 2003/0108342 | A1 | 6/2003 | Sherwood et al. |
| 2005/0235632 | A1 * | 10/2005 | Tarabulski et al. .............. 60/282 |
| 2007/0014633 | A1 * | 1/2007 | Li et al. .................... 405/128.25 |
| 2007/0031639 | A1 * | 2/2007 | Hsu et al. ...................... 428/141 |
| 2007/0180814 | A1 | 8/2007 | Tangirala et al. |
| 2008/0145631 | A1 * | 6/2008 | Bhate et al. ................... 428/220 |
| 2009/0283611 | A1 * | 11/2009 | Varanasi et al. .............. 239/366 |

FOREIGN PATENT DOCUMENTS

| | | | |
|---|---|---|---|
| EP | 1956206 | A2 | 8/2008 |
| FR | 2089393 | | 1/1972 |
| WO | 2004079171 | A1 | 9/2004 |

OTHER PUBLICATIONS

Gemci, et al., "Cavitation And Flash Boiling Atomization of Water/Acetone Binary Mixtures", International Journal of Multiphase Flow, vol. 30, Issue 4, Apr. 2004, pp. 395-417.

Bergles, et al., "High-Flux Processes Through Enhanced Heat Transfer" Rohsenow Symposium: MIT May 16, 2003.

Bergles, et al., "Boiling and Evaporation in Small Diameter Channels", Heat Transfer Engineering, 24(1): 18-40, 2003.

Witlox, et al., "Flashing Liquid Jets and Two-Phase Dispersion", Journal of Hazardous Materials, vol. 142, Issue 3, Apr. 11, 2007, pp. 797-809.

Gemci, et al., "Cavitation Enhanced Flash Atomization of Hydrocarbon Liquids" International Journal of Multiphase Flow , vol. 30 , Issue 4 , pp. 395-417, Sep. 2001.

International Search Report for application No. 09167927.4-2425, dated Oct. 2, 2009.

* cited by examiner

SURFACE TREATMENTS AND COATINGS FOR FLASH ATOMIZATION

BACKGROUND OF THE INVENTION

The present disclosure relates to surfaces and coatings for flash atomization, and more particularly, relates to incorporating enhanced surface technologies to improve flash atomization.

Atomization generally refers to the conversion of bulk liquid into a spray or mist (i.e. collection of drops), often by passing the liquid through a nozzle. An atomizer is an apparatus for achieving atomization. Common examples of atomization systems can include: gas turbines, carburetors, airbrushes, misters, spray bottles, and the like. In internal combustion engines for example, fine-grained fuel atomization can be instrumental to efficient combustion.

Current air-blast atomizers spread liquid from a nozzle orifice into a film on one or more pre-filming regions. The atomizers can use pressure, airflow, electrostatic, ultrasonic, and other like methods to create instabilities in the bulk liquid film to form droplets. Flash atomizers have been shown to produce very small droplets of uniform size, typically ranging from about 5 to about 300 micrometers. The droplet size is small for the flash vaporizer because enough vapor is generated in a channel, or orifice in the case of a cylindrical atomizer, to form a two-phase flow prior to injection of the fluid into a low pressure ambient environment. Typically, the surface of the channel is substantially smooth. The flash evaporation occurs when a subcooled liquid at high pressure flows into the pressure-reducing channel. The vapor is produced on the channel surface when the liquid temperature is high enough above the local bubble point (i.e., incipient superheat) that heterogeneous nucleation can occur on the channel surface. A two-phase fluid occurs as a result.

The flash atomization process, however, requires heating and pressurizing of the fluid upstream of the channel, in order to generate vapor in the channel required to form the two-phase flow. The heat and pressure required to flash vaporize the fluid can be very high for a given application, which can be costly, from both an operating and equipment standpoint. Reducing the fluid heating and high pressure pumping demands could significantly reduce operating costs and improve flash atomization performance.

BRIEF DESCRIPTION OF THE INVENTION

Disclosed herein are flash atomizers having a surface configured for promoting the atomization of a liquid. In one embodiment the flash atomizer includes a channel substrate configured to generate a vapor and form a two-phase flow of a fluid; and an enhanced surface disposed on the channel substrate and configured to change a temperature and a pressure required to form the vapor, wherein the enhanced surface texture comprises a plurality of active nucleation sites configured to promote heterogeneous bubble nucleation.

An apparatus for controlling the emissions of nitrogen oxides from a combustion system include an injector in fluid communication with an exhaust gas containing the nitrogen oxides, wherein the injector is configured to inject an atomized chemical reducing agent into the exhaust gas, wherein the chemical reducing agent is configured to convert the nitrogen oxides to nitrogen; and a flash atomization system in fluid communication with the injector and configured to atomize the chemical reducing agent, wherein the flash atomization system includes a channel substrate configured to generate a vapor from the chemical reducing agent and form a two-phase chemical reducing agent flow; and an enhanced surface disposed on the channel substrate and configured to change a temperature and a pressure required to form the vapor, wherein the enhanced surface texture comprises a plurality of active nucleation sites configured to promote heterogeneous bubble nucleation.

The above described and other features are exemplified by the following figures and detailed description.

BRIEF DESCRIPTION OF THE DRAWINGS

Referring now to the figures wherein the like elements are numbered alike.

DETAILED DESCRIPTION OF THE INVENTION

Figure 1:
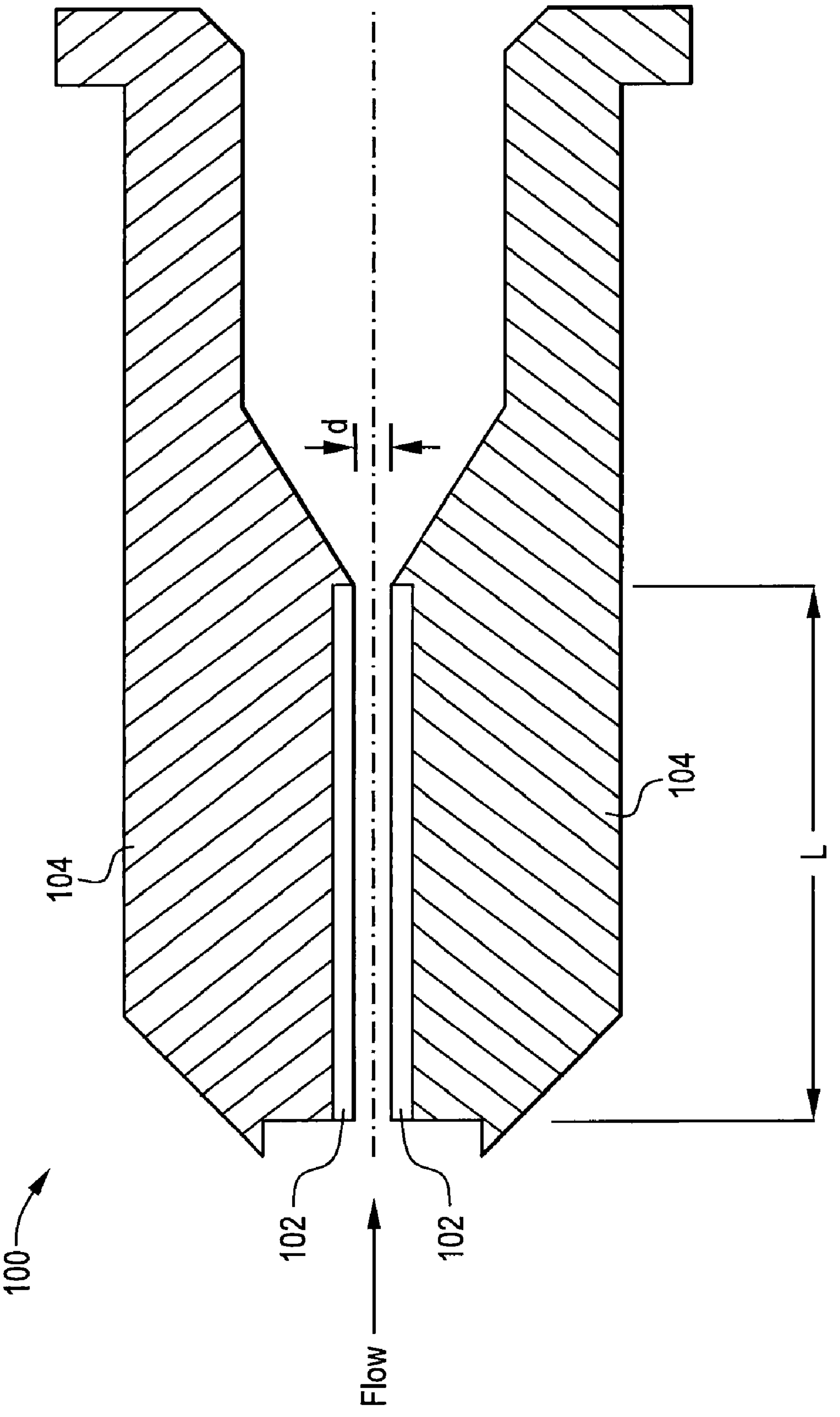
FIG. 1 is a cross-sectional schematic of an exemplary embodiment of a flash atomizer comprising the enhanced surface.

The flash atomizers and flash atomization systems described herein include an enhanced surface to reduce the superheat and pressure required to produce a two-phase flow regime in the atomizer channel or orifice. The superheat and pressure can be reduced compared to current flash atomizers and systems that utilize smooth channel, and orifice or untreated surfaces. The enhanced surfaces described herein are configured to reduce the superheat required for boiling incipience (i.e., initial bubble nucleation of the liquid). The enhanced surfaces also can increase vapor generation for a given superheat relative to the smooth surfaces of current flash atomizers, because the enhanced surfaces comprise far more active nucleation sites of controllable size and distribution than the current atomizer surfaces. Moreover, a flash atomizer comprising the enhanced surfaces can generate very small uniform droplets with a reduced channel length-to-hydraulic diameter ratio (L/dh), and at a reduced injection pressure compared to current flash atomizers.

The enhanced surface of a flash atomizer can comprise a textured surface treatment to an atomizer surface, a coating on the surface, or a combination of the two. Regardless of whether the enhanced surface comprises a textured surface treatment or a coating or both, the enhanced surface represents a modification of a plain, smooth surface within the atomizer. As used herein, the term enhanced surface is intended to generally refer to any non-smooth atomizer surface, which is configured to improve the heat transfer capabilities of the atomizer, thereby reducing the superheat and pressure required to vaporize the liquid and generate a two-phase fluid flow for injection. The systems as described herein can be used with pure fluids and fluid mixtures alike. Exemplary enhanced textured surface treatments can include, without limitation, scoring, knurling, roughening, embossing, sand blasting, etching, pyrolyzing, and the like. A selected one or all of these treatments are configured to create active nucleation sites (e.g., subsurface cavities, and the like) for vapor entrapment and the consequential promotion of nucleate boiling. Exemplary enhanced surface coatings can include, without limitation, sintered, thermal sprayed, or the like surfaces on the existing smooth or non-smooth atomizer surface. Like the enhanced surface treatments, these coatings are configured to increase the amount of active nucleation sites, thereby reducing the superheat required for initial fluid bubble nucleation.

The enhanced surface treatments and coatings can have a depth suitable to increase the active nucleation sites of the atomizer surface, in order to reduce the superheat and pressure required for vapor generation. In an exemplary embodiment, the enhanced surface can extend to a depth of about 0.01 micrometers (μm) to about 500 μm, specifically about 0.05 μm to about 100 μm, more specifically about 0.1 μm to about 50 μm within an atomizer substrate. A flash atomizer or atomization system comprising the enhanced surfaces can generate finer, more uniform droplets than their current counterparts. Exemplary mean droplet size for the flash atomizer described herein can be about 3 μm to about 300 μm, specifically about 5 μm to about 100 μm, and more specifically about 10 μm to about 50 μm.

The enhanced surfaces described herein can have a significant impact on flash atomizers and the processes in which they are disposed. In general, a measure of flash atomizer performance is the gas-to-liquid or vapor-to-liquid ratio and pressure drop required to produce a spray of a given mean drop size. Consequently, the ability to reduce the atomizer superheat necessary to produce the same gas-to-liquid or vapor-to-liquid ratio required for a spray of the required quality represents a system-level energy savings benefit. The use of the enhanced surfaces on the atomizer vapor generating surfaces can advantageously result in an improvement in spray quality for a given pressure drop or gas-to-liquid or vapor-to-liquid ratio relative to an atomizer without the enhanced surfaces. Further, the enhanced surfaces of the atomizer permit a lower liquid supply temperature for a given mean droplet size. This reduced temperature can represent a savings in the heating required to supply the liquid to the atomization system.

Referring to the drawings in general and to FIG. 1 in particular, it will be understood that the illustrations are for the purpose of describing a particular embodiment of the article disclosed herein and are not intended to be limited thereto. FIG. 1 is a schematic cross-sectional view of an exemplary flash atomizer 100. Reference herein will be made to the use of enhanced surfaces of an atomizer for use in emissions control of a furnace combustion system. It is to be understood, however, that the enhanced surfaces disclosed herein, can be advantageously used in any flash or effervescent atomization system to improve atomizer performance. Examples of systems requiring flash atomization can include, without limitation, agriculture, food preparation, painting, washing, fuel injection, and other like processes that require injection of a uniform size mist for fast evaporation into a carrier gas or oxidant. As described herein, the use of enhanced surfaces can refer to a textured surface, a surface coating, or a combination of both that can result in finer and more uniform droplet sizes, at a reduced superheat and injection pressure, when compared to current flash atomizers and systems without such enhanced surfaces.

FIG. 1 illustrates the cross-sectional view of an enhanced boiling flash atomizer 100. The atomizer 100 comprises an enhanced surface 102. In one embodiment, the atomizer 100 can be part of an injector. The enhanced surface 102 comprises the surface of the atomizer channel 104. Although not evident from the cross-section, the channel can have a rectangular, square, polygonal, circular, or the like shape. A circular channel can sometimes be referred to as an orifice tube. The channel will depend, in part, on the type, size, and shape of atomizer being used. The channel has a diameter "d" and a length dimension "L". Both the diameter and length can have any dimensions suitable for creating a two-phase fluid that can be injected downstream in the atomizer into an ambient atmosphere well below the fluid bubble point pressure. In an exemplary embodiment, the channel 104 has a diameter of about 10 μm to about 2000 μm, specifically about 100 μm to about 2000 μm, and more specifically about 200 μm to about 2000 μm. Exemplary channel lengths can be from about 0.1 millimeters (mm) to about 50 mm, specifically about 0.5 mm to about 25 mm, and more specifically about 1 mm to about 10 mm. The increased heterogeneous bubble nucleation and vapor generation caused by the enhanced surface 102 can reduce the channel 104 length-to-hydraulic diameter ratio (L/dh). The ratio, therefore, can be about 1 to about 200, specifically about 1 to about 100, and more specifically about 1 to about 50.

Liquid is flash evaporated in the atomizer 100 when a sub-cooled liquid, at high pressure, flows into the pressure-reducing channel 104 creating a two-phase fluid that is injected at atmosphere, below the bubble point pressure. As a result of the pressure-drop across the atomizer to the channel 104, boiling bubbles are generated in the liquid film on the enhanced surface 102, i.e., gas or vapor is formed in the liquid. Subsequent "flashing" results in the explosion or fragmentation of the droplets, due to the presence of gas or vapor in the liquid. Such fragmentation results in the generation of the fine droplets in the gaseous medium.

The enhanced surface 102 covers at least a portion of the channel substrate 104. In an exemplary embodiment, the enhanced surface 102 completely covers the entire channel substrate 104 surface. As stated earlier, the enhanced surface 102 is configured to provide the channel 104 with more active nucleation sites than a non-enhanced surface would have. The increased number of active nucleation sites reduces the superheat required for vapor generation of the fluid and can reduce the injection pressure of the atomizer 100. The additional active nucleation sites lowers the superheat required for the onset of nucleate boiling (ONB). ONB refers to boiling wherein vapor bubbles are initially formed at a given site, generally a pore in the enhanced surface. Superheat refers to the liquid temperature above the saturation temperature at a given pressure. In general, ONB occurs when the liquid temperature exceeds a critical superheat that depends on the nucleation site density, geometry, size distribution, surface energy, and the like. As liquid enters the active nucleate boiling site it vaporizes, increasing the vapor bubble until a portion of the bubble detaches and flows away from the active site. Enough vapor remains at the active site to continue nucleate boiling whereby entering liquid rapidly vaporizes enhancing the heat transfer from the heat source to the liquid.

The enhanced surface 102 can be created on the channel 104 by any method suitable for increasing the number, shape, size distribution, surface energy, and the like of the active nucleate boiling sites in the channel. In one embodiment, the existing surface of the channel 104 can be mechanically modified to form the enhanced surface 102. Modifying the surface can generally be done by mechanical means to form suitable cavities on the surface that function as nucleate boiling sites. These textured surfaces can be formed by finning, corrugating, scoring, knurling, roughening, or otherwise inscribing a combination of ridges, tunnels, valleys, and the like in order to increase the active nucleation sites on the surface. In one example, scoring or finning of the channel surface can form ridges in the metal. A subsequent knurling operation can deform the ridges, bending a portion of them into the grooves separating the ridges. The knurling step can create partially enclosed and connected subsurface cavities. These cavities provide active nucleation sites for vapor entrapment and the consequential promotion of nucleate boiling. In another example, the channel surface can first be knurled so that the surface is embossed in a pattern of grooves, the pattern depending on the knurl roll surface and the angle of the knurling roll to the channel substrate axis. The embossed surface can then be subjected to finning to complete the enhanced surface. The gaps created by the finning, can have a tapered shape due to the embossing. The tapered gaps can provide a variable width groove, which permits vapor bubbles to form. Sandblasting is yet another example in which active nucleate sites can be imparted on the channel surface. The sand blasting can mechanically damage the surface to produce small lattice defects. The surface can then be etched to remove the damaged portions and thereby form intricate interstices that will act as the active nucleate boiling sites.

For the surface modification methods described herein, the enhanced surface 102 can comprise a random orientation of active nucleation sites, or it can comprise a particular pattern of active nucleation sites. Moreover, in general, the greater the number of ridges, tunnels, valleys, slits, grooves, fins, pores, or the like in the enhanced surface, the more effective the surface will be in generating vapor bubbles.

In another embodiment, the enhanced surface 102 can comprise a coating on the channel substrate 104. Exemplary methods of coating to form an enhanced surface can include, without limitation, thermal spraying, sintering, brazing, and the like. In one embodiment, the coating can comprise chemical additives configured to change a surface energy between the channel substrate, liquid, and/or gas/vapor. For example, the chemical additives can comprise molecules embedded in the wall of the substrate, or embedded in a coating of different material applied by the methods described herein. For example, a porous enhanced surface coating can be formed on the channel substrate. The enhanced surface coating can be formed by attaching a suitable metal powder or granulated metal material onto the channel substrate by means of a sintering process, wherein the temperature of the metal matrix is raised to close to its melting temperature. The matrix then becomes joined at the boundaries between adjacent matrix particles and between matrix particles and the channel substrate. This enhanced surface coating can comprise a uniform layer of thermally conductive particles intricately bonded together to form interconnected pores of a capillary size that act as the active nucleate boiling sites. In another embodiment of forming an enhanced surface coating, the metal matrix as described above can be attached to the channel substrate by brazing, wherein a suitable adhesive substance is used to join the matrix particles to each other and to the channel.

In another embodiment, an enhanced surface coating can be formed on the channel substrate by thermal spraying (a.k.a., flame spraying or metal spraying) a metal matrix powder onto the substrate. Thermal spraying utilizes an intense flame to entrain and direct the molten metal particles against the channel surface. A metal oxide film is left bonded to the substrate. An enhanced coating produced in this manner can comprise unconnected portions between the metal particles that define interconnected open-cell active nucleation sites capable of aiding the change from liquid to vapor.

In yet another embodiment, the enhanced surface coating can comprise a metalized porous material disposed on the channel 104. For example, the porous material can comprise a foam layer disposed on the channel surface. The foam can then be made electrically conductive, such as by being electrolessly plated or by being coated with a conductive material, such as powdered graphite. The conductive foam layer can then be metalized to produce a reticular metalized structure firmly bonded to the channel substrate. The bonded metalized foam can be further pyrolyzed by flame to remove all or at least most of the foam skeleton. Left behind are hollow or partially hollow metal strands that comprise the enhanced surface coating; the hollow portions comprising the active nucleation sites.

Figure 2:
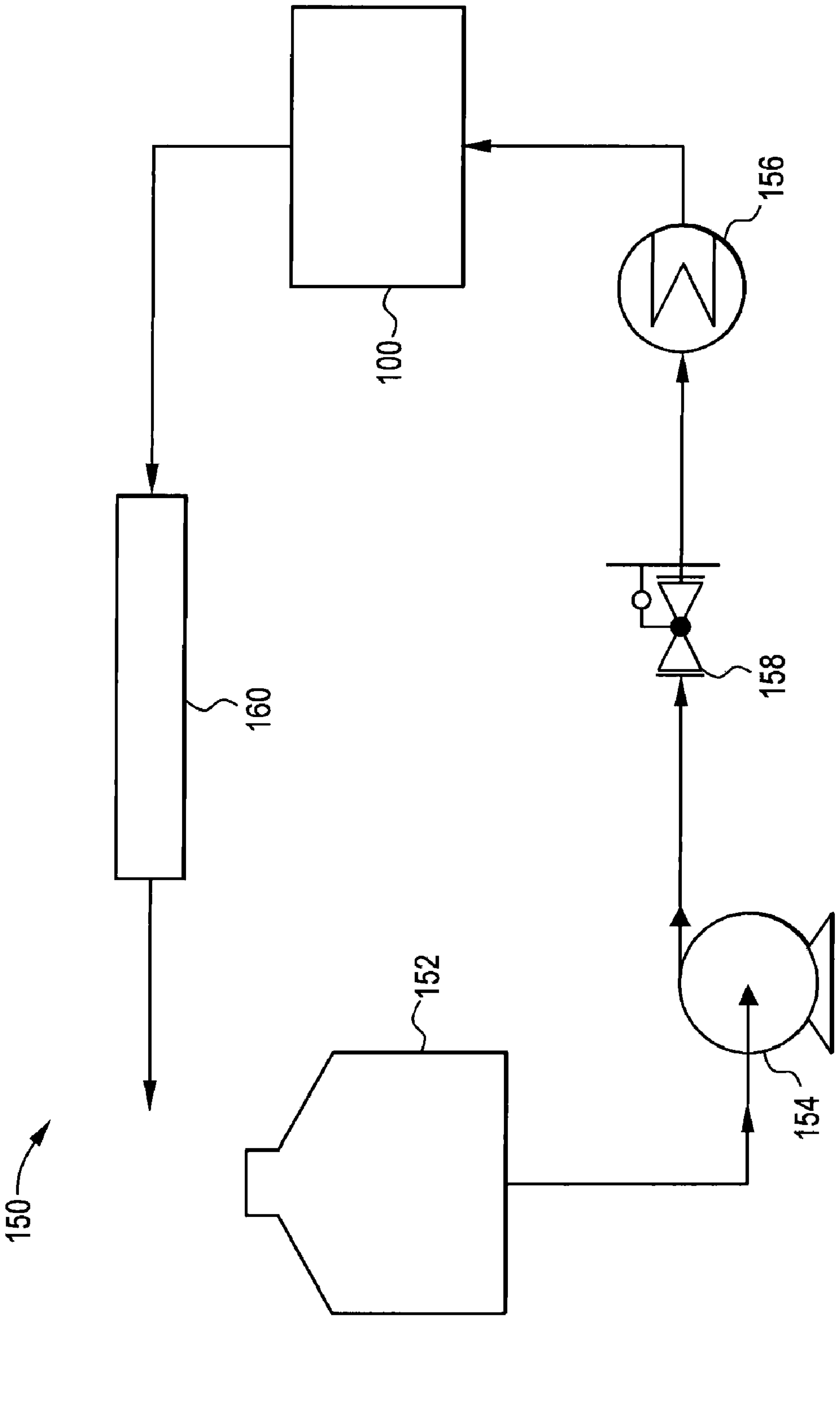
FIG. 2 is a process flow schematic for an exemplary embodiment of a flash atomization process.

Turning now to FIG. 2, the flash atomizer 100 can be one component of a larger flash atomization system 150. FIG. 2 is a schematic process flow diagram illustrating the flash atomization system 150. A feed tank 152 is configured to hold the fluid to be atomized. A pump 154 can be in fluid communication with the tank 152, and is configured to pump the fluid through the system to the flash atomizer 100. A heat exchanger 156 can be disposed between the pump 154 and the flash atomizer 150 to control the liquid temperature prior to entering the flash atomizer. A flow control valve 158 can be disposed in fluid communication with the pump 154. The flow control valve 158 can be configured to control the flow rate of liquid flowing into the flash atomizer 100, and therefore, control the pressure in the atomizer. The flash atomizer 100 can further comprise a component (e.g. injector) suitable for delivering the atomized fluid to a desired process 160. As mentioned above, exemplary processes that can benefit from enhanced boiling flash atomizers can include, without limitation, agriculture, food preparation, painting, washing, fuel injection, emissions control, and the like.

Reduction of nitrogen oxides from the exhaust of flue gases is one exemplary area of emission control suitable for the flash atomization system as described herein. The process for controlling emissions of nitrogen oxides from combustion systems can involve post-combustion injection of a chemical reducing agent. Chemical reducing agents can comprise any suitable compound known to reduce nitrogen oxide emissions in exhaust systems. Examples can include ammonia, urea, and the like. Moreover, fuels and fuel mixtures can be used in systems for controlling emissions, such as diesel, jet-fuel, logistic fuel (JP-8), kerosene, fuel oil, bio-diesel, gasoline, short chain alcohols such as ethanol, combinations of ethanol-containing gasoline such as E-10, E-85, E-90, and E-95, and the like. Exemplary post-combustion nitrogen oxide reducing systems can include, without limitation, selective catalytic reduction (SCR), selective non-catalytic reduction (SNCR), non-ammonia selective catalytic reduction (NASCR), and the like. In one embodiment, for example, the flash atomizer as described herein can be advantageously used in a SNCR system for reducing nitrogen oxides in an exhaust. In an SNCR system, a chemical reducing agent, such as urea or ammonia for example, is added to a combustion exhaust where it reacts with oxides of nitrogen to reduce them to a molecular state. An aqueous solution of the ammonia (or urea) is injected into the flue gas conduit at a temperature favorable to convert the nitrogen oxides ($NO_X$) to nitrogen ($N_2$). The flash atomizer 100 comprising the enhanced surface 102 can be configured to generate small aqueous ammonia droplets of uniform size. The fine, uniform size of the ammonia droplets are then able to quickly evaporate into a carrier gas, such as air. The ammonia-air mixture can then be injected into the flue gas to reduce nitrogen oxides emissions. In an exemplary embodiment, utilizing the flash atomizer 100 in an emission control system as described herein can reduce nitrogen oxides emissions by about 20 percent to about 80 percent, depending on the application and mixing effectiveness. Again, the enhanced surface of the flash atomizer advantageously comprises more active nucleation sites than current atomizer surfaces, and therefore, is able to more quickly evaporate the ammonia into the carrier gas, while doing so at a lower temperature and pressure.

The flash atomizers and flash atomization systems described herein advantageously include an enhanced surface to reduce the superheat and pressure required to produce a two-phase flow regime in the atomizer channel or orifice. The enhanced surface comprises a textured surface treatment or a coating on the channel substrate that increases the amount of active nucleate boiling sites within the atomizer. Therefore, the superheat and pressure can be reduced compared to current flash atomizers and systems that utilize non-enhanced surfaces, because the liquid is able to evaporate into the gas to form the two-phase system more quickly. In other words, the enhanced surfaces described herein can reduce the superheat required for boiling incipience (i.e., initial bubble nucleation of the liquid). Moreover, the enhanced surfaces increase vapor generation for a given superheat relative to the smooth surfaces of current flash atomizers due to the increase in number of active nucleation sites. Further, a flash atomizer comprising the enhanced surfaces can generate very small uniform droplets with a reduced channel length-to-hydraulic diameter ratio (L/dh), at a reduced injection pressure, compared to current flash atomizers. This can result in an overall reduction in operating cost for systems employing the flash atomizers described herein.

Ranges disclosed herein are inclusive and combinable (e.g., ranges of "up to about 25 wt %, or, more specifically, about 5 wt % to about 20 wt %", is inclusive of the endpoints and all intermediate values of the ranges of "about 5 wt % to about 25 wt %," etc.). "Combination" is inclusive of blends, mixtures, alloys, reaction products, and the like. Furthermore, the terms "first," "second," and the like, herein do not denote any order, quantity, or importance, but rather are used to distinguish one element from another, and the terms "a" and "an" herein do not denote a limitation of quantity, but rather denote the presence of at least one of the referenced item. The modifier "about" used in connection with a quantity is inclusive of the stated value and has the meaning dictated by context, (e.g., includes the degree of error associated with measurement of the particular quantity). The suffix "(s)" as used herein is intended to include both the singular and the plural of the term that it modifies, thereby including one or more of that term (e.g., the colorant(s) includes one or more colorants). Reference throughout the specification to "one embodiment", "another embodiment", "an embodiment", and so forth, means that a particular element (e.g., feature, structure, and/or characteristic) described in connection with the embodiment is included in at least one embodiment described herein, and may or may not be present in other embodiments. In addition, it is to be understood that the described elements may be combined in any suitable manner in the various embodiments.

While the invention has been described with reference to a preferred embodiment, it will be understood that various changes may be made and equivalents may be substituted for elements thereof without departing from the scope of the invention. In addition, many modifications may be made to adapt a particular situation or material to the teachings of the invention without departing from essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A flash atomizer, comprising:

a channel substrate disposed within the flash atomizer, configured to generate a vapor and form a two-phase flow of a fluid; and an enhanced surface disposed on the channel substrate and configured to change a temperature and a pressure required to form the vapor, wherein the enhanced surface texture comprises a plurality of active nucleation sites configured to promote heterogeneous bubble nucleation.

2. The flash atomizer of claim 1, wherein the enhanced surface comprises a coating layer on the channel substrate.

3. The flash atomizer of claim 2, wherein the coating layer comprises a porous metal matrix bonded to the channel substrate, wherein the porous metal matrix comprises a plurality of interconnected pores defining the plurality of active nucleation sites.

4. The flash atomizer of claim 1, wherein the enhanced surface comprises a textured pattern, wherein the textured pattern comprises a plurality of surface features defining the plurality of active nucleation sites.

5. The flash atomizer of claim 1, wherein the channel substrate comprises a length dimension about 0.1 millimeters to about 50 millimeters.

6. The flash atomizer of claim 1, wherein the channel substrate comprises a diameter of about 10 micrometers to about 2000 micrometers.

7. The flash atomizer of claim 1, wherein the channel substrate comprises a length-to-hydraulic diameter ratio of about 1 to about 200.

8. The flash atomizer of claim 1, wherein the plurality of active nucleation sites reduce a superheat required for the onset of nucleate boiling.

9. The flash atomizer of claim 1, wherein the enhanced surface extends a depth of about 0.01 micrometer to about 500 micrometers into the channel substrate.

10. An apparatus for controlling the emissions of nitrogen oxides from a combustion system, comprising:

an injector in fluid communication with an exhaust gas containing the nitrogen oxides, wherein the injector is configured to inject an atomized chemical reducing agent into the exhaust gas, wherein the chemical reducing agent is configured to convert the nitrogen oxides to nitrogen; and a flash atomization system in fluid communication with the injector and configured to atomize the chemical reducing agent, wherein the flash atomization system comprises:

a channel substrate configured to generate a vapor from the chemical reducing agent and form a two-phase chemical reducing agent flow; and an enhanced surface disposed on the channel substrate and configured to change a temperature and a pressure required to form the vapor, wherein the enhanced surface texture comprises a plurality of active nucleation sites configured to promote heterogeneous bubble nucleation.

11. The apparatus of claim 10, wherein the chemical reducing agent is ammonia, urea, a fuel, a fuel mixture, or a combination comprising at least one of the foregoing.

12. The apparatus of claim 10, wherein the enhanced surface comprises a coating layer on the channel substrate.

13. The apparatus of claim 12, wherein the coating layer comprises a porous metal matrix bonded to the channel substrate, wherein the porous metal matrix comprises a plurality of interconnected pores defining the plurality of active nucleation sites.

14. The apparatus of claim 10, wherein the enhanced surface comprises a textured pattern, wherein the textured pattern comprises a plurality of surface features defining the plurality of active nucleation sites.

15. The apparatus of claim 10, wherein the channel substrate comprises a length of about 0.1 millimeters to about 50 millimeters.

16. The apparatus of claim 10, wherein the channel substrate comprises a diameter of about 10 micrometers to about 2000 micrometers.

17. The apparatus of claim 10, wherein the channel substrate comprises a length-to-hydraulic diameter ratio of about 1 to about 200.

18. The apparatus of claim 10, wherein the enhanced surface extends a depth of about 0.01 micrometers to about 500 micrometers into the channel substrate.

19. The apparatus of claim 10, wherein the plurality of active nucleation sites reduce a superheat required for the onset of nucleate boiling.

20. The apparatus of claim 10, wherein the nitrogen oxides in the exhaust are reduced by about 20 percent to about 80 percent.

* * * * *